(No Model.)
T. A. & W. T. JEBB.
Method of Obtaining Starch from Grain.
No. 239,171. Patented March 22, 1881.
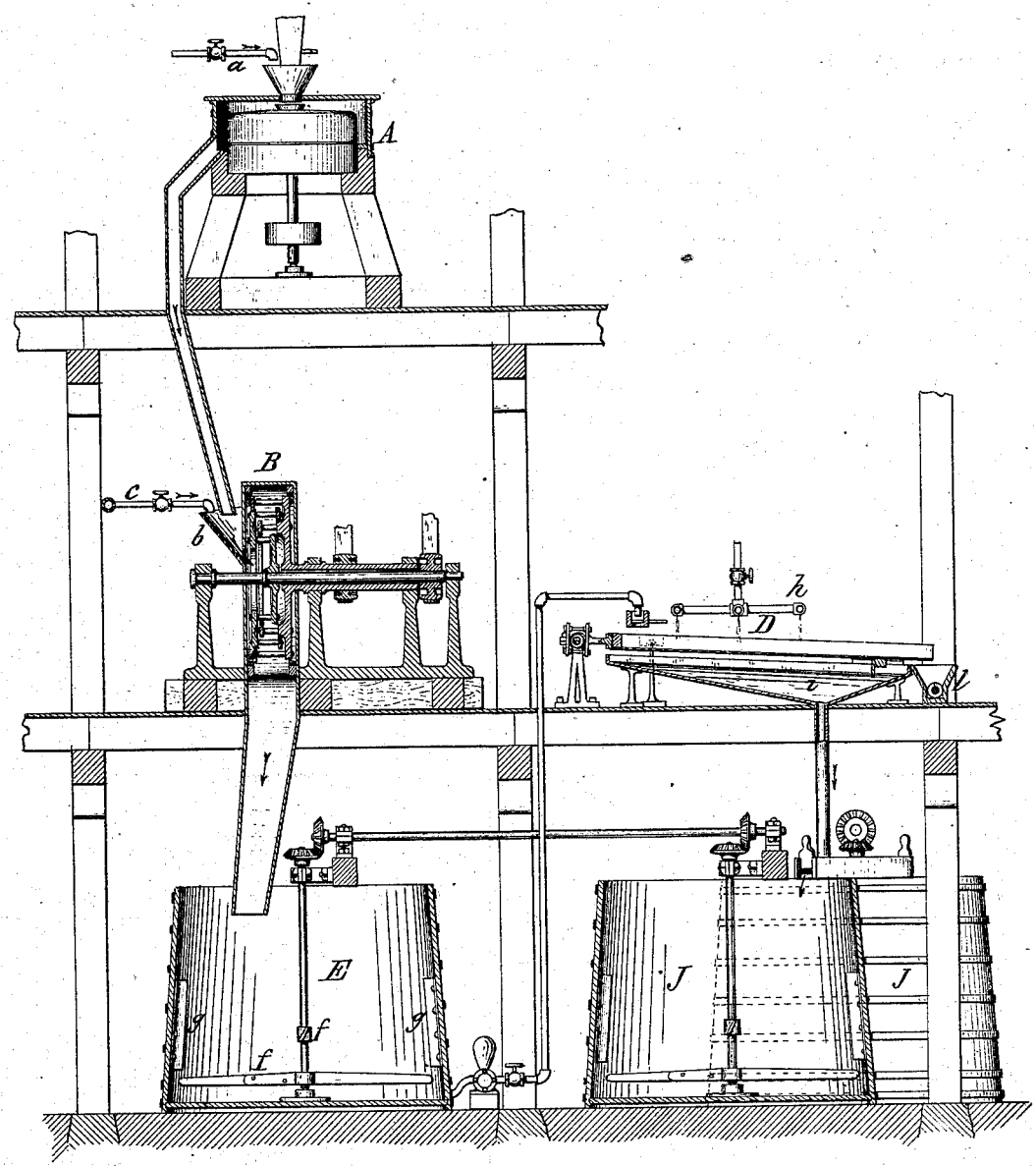
Chas. J. Buchheit
Edw. J. Brady.
Witnesses.
Thomas A. Jebb
William T. Jebb. Inventors.
By Wilhelm & Bonner
Attorneys.

UNITED STATES PATENT OFFICE.

THOMAS A. JEBB AND WILLIAM T. JEBB, OF BUFFALO, NEW YORK.

METHOD OF OBTAINING STARCH FROM GRAIN.

SPECIFICATION forming part of Letters Patent No. 239,171, dated March 22, 1881.

Application filed February 5, 1881. (No model.)

*To all whom it may concern:*

Be it known that we, THOMAS A. JEBB and WILLIAM T. JEBB, of the city of Buffalo, in the county of Erie and State of New York, have invented new and useful Improvements in Methods for Obtaining Starch from Grain, of which the following is a specification, reference being had to the accompanying drawing.

This invention relates to an improvement in the manufacture of starch from grain, more especially Indian corn or maize, and has for its object to increase the yield of starch and to expedite the work. In the process heretofore most generally employed for obtaining starch from Indian corn the latter is first steeped in warm water and then ground between millstones, a stream of water being admitted between the grinding-surfaces with the steeped corn. In this mode of treating corn a considerable portion of the gluten and bran is ground fine and passes with the starch through the separating-sieve, and must be removed from the starch by the employment of alkali, and a considerable portion of the starch adheres to the larger fragments of bran and gluten and passes with these substances into the feed or offal.

The object of our invention is to remedy these difficulties; and it consists of the hereinafter-described method of obtaining starch from grain, whereby the bran and gluten are separated from the starch in a coarsely-broken state without being ground, and the starch is carried off by the water, as will be hereinafter fully set forth.

The accompanying drawing represents a sectional elevation of the apparatus employed in carrying out our improved process.

A represents a grinding-mill, provided with a pair of stones of any suitable and well-known construction, between which the grain is ground high, so as not to pulverize the bran and gluten while pulverizing the softer starchy portions of the kernels.

B represents a disintegrating apparatus, of any suitable and well-known construction, in which the material discharged from the mill A is subjected to the action of beaters, whereby the starch still adhering to the fragments of bran and gluten is detached therefrom. A stream of water is conducted between the grinding-surfaces of the mill A by a pipe, *a*, and the wet ground material discharged from the mill A passes into the feed-hopper *b* of the disintegrating apparatus, where an additional supply of water from a pipe, *c*, may be mixed with the material, if necessary. A disintegrating-machine provided with several concentric rows of pins or beaters, revolving in opposite directions, as shown in the drawing, is preferably employed.

D represents a shaking-sieve, upon which the wet material may be discharged directly from the disintegrator for separating the starch from the bran and gluten; but the wet material from the disintegrator is preferably first discharged into a mixing-tank, E, where the material is thoroughly mixed to a uniform density before it is taken to the sieve D. The tank E is provided with one or more rotating stirrers, *f*, and projecting breakers *g*, to thoroughly mix the material. The liquid is pumped from the mixing-tank E to the sieve D, which latter effects a separation of the starch from the bran and gluten. The starch is washed through the meshes of the sieve by the water-spray from the pipes *h*, and is collected in the receptacle *i* and conducted to the settling-tanks J, while the bran and gluten pass over the tail end of the sieve and are carried, by a conveyer, *l*, to a suitable receptacle. The starch is treated in the tank J in any suitable and well-known manner with reference to the ultimate product desired, whether commercial starch, grape-sugar, or glucose, beer, spirits, or the like.

By this improved process the starch is more completely extracted from the grain and separated from the bran and gluten than heretofore, and a larger quantity of grain can be treated in the same length of time, as the grinding-stones need not be set so closely together.

We are aware that it has been proposed to obtain starch from corn by freeing the corn from the hull and germ, then expelling, by violent agitation, the steep-water and soluble gluten from the uncrushed grain, and then grinding, crushing, or disintegrating the starchy portion of the grain, and this we do not claim; but

We claim as our invention—

The herein-described method of obtaining starch from grain, which consists in first grinding the grain high with water, whereby the greater portion of the starch is loosened and carried onward with the water, while the bran and gluten are coarsely broken, then whipping or beating the wet ground grain, whereby any starch which still adheres to the fragments of gluten and bran is detached therefrom without pulverizing the gluten and bran, and the whole is carried off with the water, and then separating the gluten and bran from the water with which the starch is mixed by sifting, substantially as set forth.

THOMAS A. JEBB.
WILLIAM T. JEBB.

Witnesses:
 JNO. J. BONNER,
 EDW. J. BRADY.